(12) United States Patent
Kuo et al.

(10) Patent No.: US 8,054,442 B2
(45) Date of Patent: Nov. 8, 2011

(54) LOW COLOR SHIFT POLARIZER ASSEMBLY, AND BACK LIGHT UNITS AND LIQUID CRYSTAL DISPLAYS CONTAINING THE SAME

(75) Inventors: Hui-Lung Kuo, Taipei (TW); Mei-Chih Peng, Taoyuan County (TW); Pin-Chen Chen, Taipei (TW); Ying-Jui Lin, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 261 days.

(21) Appl. No.: 12/433,748

(22) Filed: Apr. 30, 2009

(65) Prior Publication Data
US 2009/0273742 A1 Nov. 5, 2009

(30) Foreign Application Priority Data

May 1, 2008 (TW) ................ 97116054 A
Jan. 14, 2009 (TW) ................ 98101182 A (51) Int. Cl.
*G02F 1/1335* (2006.01)
(52) U.S. Cl. ............. 349/194; 349/96; 349/98; 349/162
(58) Field of Classification Search .................. None
See application file for complete search history.

(56) References Cited

U.S. PATENT DOCUMENTS

| | | | |
|---|---|---|---|
| 5,235,443 A | 8/1993 | Barnik et al. | |
| 5,506,704 A | 4/1996 | Broer et al. | |
| 5,691,789 A | 11/1997 | Li et al. | |
| 5,731,886 A | 3/1998 | Taber et al. | |
| 5,808,794 A | 9/1998 | Weber et al. | |
| 6,015,507 A * | 1/2000 | Kobayashi et al. | 252/299.01 |
| 6,016,177 A * | 1/2000 | Motomura et al. | 349/98 |
| 6,088,159 A | 7/2000 | Weber et al. | |
| 6,339,501 B1 * | 1/2002 | Kameyama et al. | 359/485.03 |
| 6,449,092 B1 | 9/2002 | Weber et al. | |
| 6,537,624 B1 * | 3/2003 | Suzuki et al. | 428/1.3 |
| 6,669,999 B2 | 12/2003 | Hsieh et al. | |
| 6,833,891 B2 * | 12/2004 | Jiang et al. | 349/115 |
| 2001/0048497 A1 * | 12/2001 | Miyachi et al. | 349/117 |
| 2002/0075434 A1 * | 6/2002 | Jiang et al. | 349/129 |
| 2003/0063245 A1 * | 4/2003 | Bowley et al. | 349/115 |
| 2003/0142256 A1 * | 7/2003 | Maeda et al. | 349/115 |
| 2005/0068620 A1 * | 3/2005 | Umeya | 359/459 |
| 2008/0273151 A1 * | 11/2008 | Kuo et al. | 349/115 |

* cited by examiner

*Primary Examiner* — Mike Stahl (57) ABSTRACT

A low color shift polarizer assembly is provided, comprising a cholesteric liquid crystal film with a plurality of very tiny grooves which are irregularly dispersed on a surface of the cholesteric liquid crystal film. The selective reflective wavelength range of the cholesteric liquid crystal film has a long wavelength boundary $\geq 700$ nm and a short wavelength boundary $\leq 420$ nm. A quarter wavelength retardation plate can be disposed on the cholesteric liquid crystal film to build up the final low color shift polarizer assembly. The polarizer assembly can be combined with a backlight unit and further with a liquid crystal display to provide low color shift at large viewing angles and high brightness.

16 Claims, 10 Drawing Sheets

LOW COLOR SHIFT POLARIZER ASSEMBLY, AND BACK LIGHT UNITS AND LIQUID CRYSTAL DISPLAYS CONTAINING THE SAME

CROSS REFERENCE TO RELATED APPLICATIONS

This Application claims priority of Taiwan Patent Application No. 97116054, filed on May 1, 2008 and Taiwan Patent Application No. 98101182, filed on Jan. 14, 2009, the entirety of which are incorporated by reference herein.

BACKGROUND OF THE INVENTION

1. Field of the Invention

The invention relates to optical components, and more particularly to a low color shift polarizer assembly, and a back light unit and a liquid crystal display containing the color shift polarizer assembly.

2. Description of the Related Art

Liquid crystal displays (LCD) operate by utilizing a light valve mechanism comprising a polarizing light and a liquid crystal layer, wherein voltages are used to change retardations of the liquid crystal layer to display images. The polarizing lights normally operate by using polarizers to separate polarizing lights having single axes from natural lights of the light sources. However, at least a half of the incident lights are absorbed by the polarizers in the above described process, such that the efficiency of the light energy is reduced.

In order to overcome the above described problems, polarized states translation films are used to transfer natural light without being polarized into a single polarized state light. In this example, brightness of the liquid crystal display can be enhanced, since a polarized axis of the polarized states translation film corresponds with a transmissive axis of the polarizer. Meanwhile, U.S. Pat. No. 5,235,443 discloses a method for increasing brightness of projection displays, wherein a cholesteric liquid crystal layer is coated on a spherical surface of a light bulb.

The cholesteric liquid crystals can selective reflect and transmit lights of specific wavelength ranges. The lights can be separated by polarization through selection of the polarizing lights of the cholesteric liquid crystals. The wavelength ranges which can produce polarization separation are dependant upon the sizes of the pitches and the reflective indexes of the cholesteric liquid crystals.

A helical pitch p of the cholesteric liquid crystals is represented by the liquid crystal molecules in the same layer having an average axis in a helical structure of the cholesteric liquid crystals, wherein the average axis is rotated an angle along a direction of the helical axis with one by one the layers. Note that the rotating angle is 360 degrees, and a distance in the direction of the helical axis is the helical pitch p. The helical pitch p is a character of the cholesteric liquid crystals. Thus, a polarizing reflective wavelength $\lambda$ and a width of the wavelength $\Delta\lambda$ of the cholesteric liquid crystals through the helical pitch p is expected, and can be represented by the formulas below:

$$\lambda = n \cdot p; \text{ and}$$

$$\Delta\lambda = \Delta n \cdot p,$$

wherein n=an average reflection of the cholesteric liquid crystals, $\Delta n$=a complex reflection (ne-no) of the cholesteric liquid crystals, and $\Delta\lambda$=the width of the polarizing reflective wavelength of the cholesteric liquid crystals. In a natural condition, the $\Delta\lambda$ produced by $\Delta n$ is about a width of several tens of nm. A cholesteric liquid crystal film of a large $\Delta\lambda$ can be formed by different temperatures or through the fabrication methods of U.S. Pat. Nos. 6,669,999, 5,506,704 or 5,691,789.

A cholesteric liquid crystal film polarized element can be disposed between a backlight module and a display panel. In this example, when the lights from the backlight module are able to enter the cholesteric liquid crystal film, only the circular polarizing lights having a rotation direction contrary to a helix direction of the cholesteric liquid crystal film passes through the cholesteric liquid crystal film. Specifically, the circular polarizing lights having a rotation direction which is the same as a helix direction of the cholesteric liquid crystal film, is reflected toward the backlight module, recycled by the reflection mechanism of the backlight module and recombined with the backlight to be transferred into the display panel again. Therefore, brightness of the display is enhanced by about two times.

Figure 1A:
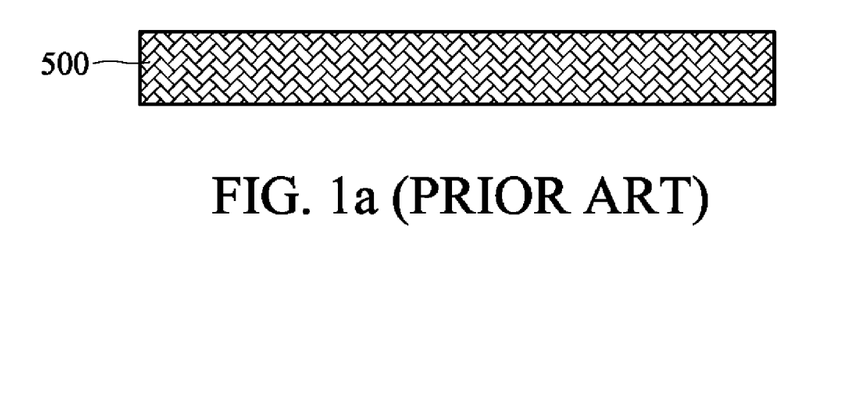
FIG. 1a is a cross section showing a conventional cholesteric liquid crystal film without grooves.
Figure 1B:
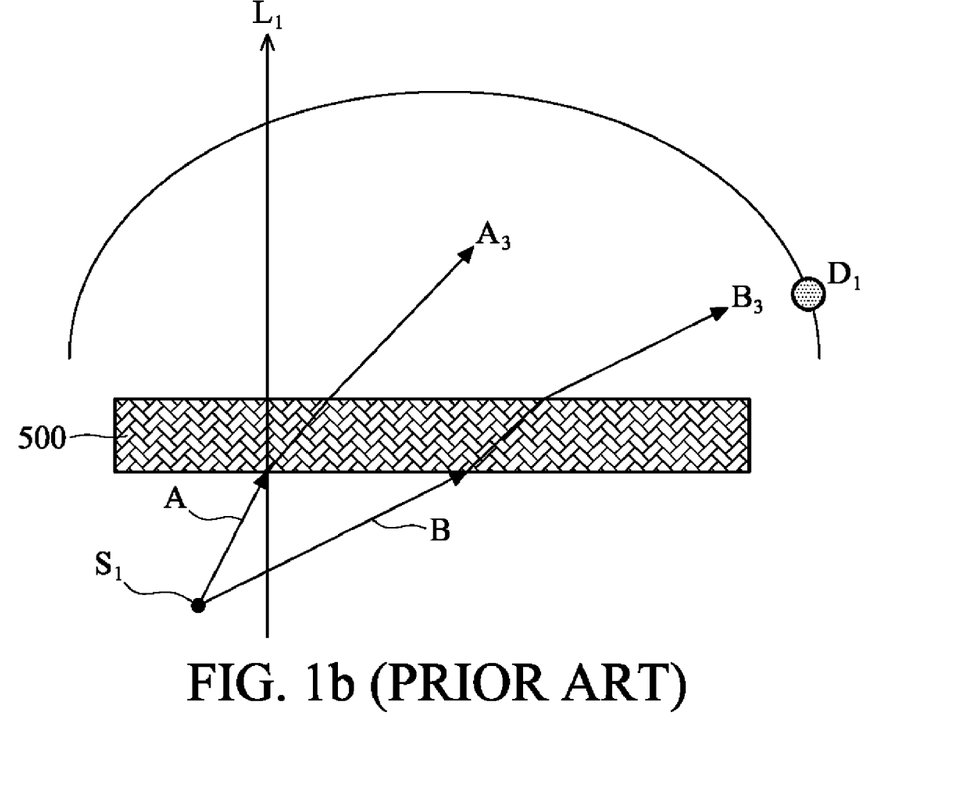
FIG. 1b is a cross section showing light intensity distribution states for light $S_1$ leaving the conventional cholesteric liquid crystal film without grooves.

However, color shift in off-axis directions of the polarizing light separation film easily occurs in the cholesteric liquid crystal film. Referring to FIG. 1a, a cross section of a conventional cholesteric liquid crystal film 500 without grooves is shown. The liquid crystal molecules in the conventional cholesteric liquid crystal film 500 without grooves are normally arranged to form an area without grooves or a uniform domain, such that a significant mirror surface effect is produced. When lights enter the conventional cholesteric liquid crystal film 500 without grooves, transmission and reflections with simple and identical directions are produced. Therefore, better transmission of lights is produced and enhanced brightness effect and lower color shift are obtained in a small viewing angle range of the conventional cholesteric liquid crystal film 500 without grooves. However, along with an increase of the viewing angle, color shift with light color different to light color of the original light can be easily observed in an off-axis large viewing angle range. Referring to FIG. 1b, a schematic view of the light distribution states for the light $S_1$ leaving the conventional cholesteric liquid crystal film 500 without grooves is shown. An angle between the path B of the light and the normal line $L_1$ is larger than that between the path A of the light and the normal line $L_1$, such that the exit light $B_3$ from the light of path B has higher color shift. The lights observed at a detective point $D_1$ of the large viewing angles consist of high color shift lights $B_3$. Therefore, the color shift of the conventional cholesteric liquid crystal film 500 without grooves is not improved and the enhanced brightness effect at large viewing angles is significantly reduced. Specifically, the significant changing of vision effects with viewing angles are undesirable for display applications, especially for the applications of large size displays. For detailed discussion of the color shift, reference may be made to D. Coates, et. al. IDW'96 Proceeding p. 309.

U.S. Pat. No. 5,731,886 discloses a method for color shift compensation. A positive C-plate is provided for color shift compensation. However, color shift compensation by this method is limited and the selectivity of materials for the positive C-plates is limited. Moreover, it is difficult to directly fabricate a large size positive C-plate on a polarizing light separation film. U.S. Pat. Nos. 5,808,794, 6,449,092 and 6,088,159 disclose a method for extending an effective wavelength range of a polarizing light separation film toward an infrared ray area. However, the lights used for the resulting displays normally do not have continuous spectra, and the method is only applicable to some polarized light separating films with certain properties and some certain viewing directions. Therefore, the method still does not completely overcome the problem with color shift of displays at large viewing angles.

Therefore, a polarizer assembly is desired to overcome color shift of displays at large viewing angles and to achieve enhanced brightness effect.

BRIEF SUMMARY OF THE INVENTION

The invention provides a low color shift polarizer assembly comprising a cholesteric liquid crystal film with a plurality of grooves irregularly dispersed on a surface of the cholesteric liquid crystal film, having a reflective wavelength range of a long wavelength boundary ≧700 nm and a short wavelength boundary ≦420 nm, and a quarter wavelength retardation plate disposed on the cholesteric liquid crystal film.

The invention further provides a low color shift polarizing light source comprising a backlight module and the low color shift polarizer assembly of this invention disposed over a light emitting surface of the backlight module.

In addition, the invention further provides a liquid crystal display comprising a liquid crystal cell and a pair of top and bottom polarizers oppositely disposed, sandwiching the liquid crystal cell. A backlight source is disposed under the bottom polarizer. The low color shift polarizer assembly of this invention is disposed between the backlight source and the bottom polarizer, wherein the cholesteric liquid crystal film of the low color shift polarizer assembly faces the backlight source.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

Figure 2A:
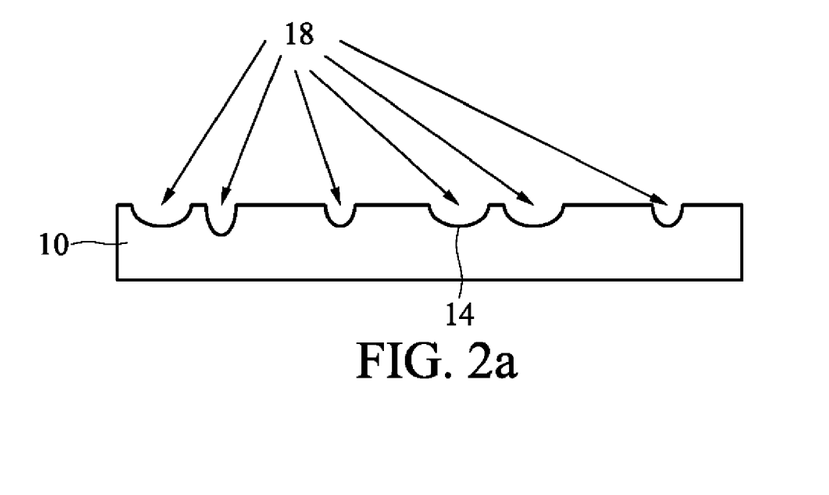
FIG. 2a is a cross section showing a cholesteric liquid crystal film with a plurality of grooves irregularly dispersed on a surface thereof according to one embodiment of the invention.
Figure 2B:
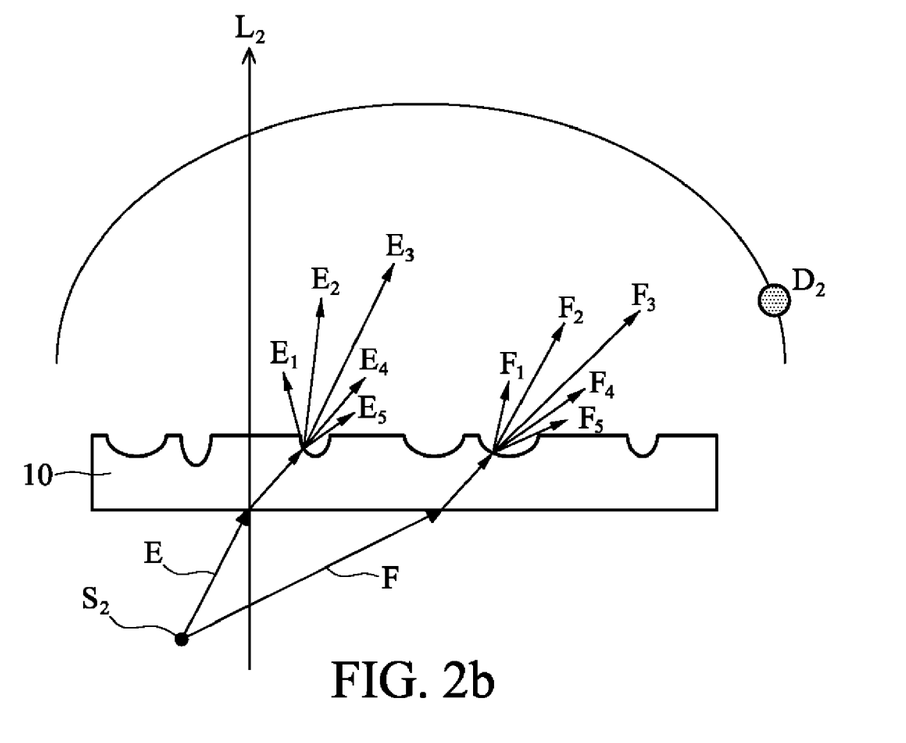
FIG. 2b is a cross section showing light intensity distribution states for light $S_2$ leaving the cholesteric liquid crystal film with a plurality of grooves irregularly dispersed on a surface thereof according to one embodiment of the invention.

Referring to FIG. 2a, a cross section of a cholesteric liquid crystal film 10 with a plurality of grooves irregularly dispersed on a surface thereof according to one embodiment of the invention is shown. The invention provides a cholesteric liquid crystal film 10 which has a plurality of grooves 18. The plurality of grooves 18 is dispersed in the cholesteric liquid crystal film 10 to form a non-continuous interfaces 14. The interfaces 14 can make lights which are moving forward, not completely oriented along with the original direction of the lights. When natural lights enter the cholesteric liquid crystal film 10, the incident lights will be dispersed by the cholesteric liquid crystal film 10. Referring to FIG. 2b, a schematic view of the light intensity distribution states for the light $S_2$ leaving the cholesteric liquid crystal film 10, having a plurality of grooves irregularly dispersed on a surface thereof, according to one embodiment of the invention is shown. An angle between the path E of the light and the normal line $L_2$ is small, such that the exit lights $E_1$, $E_2$, $E_3$, $E_4$ and $E_5$ thereof have low color shift. However, an angle between the path F of the light and the normal line $L_2$ is large, such that the exit lights $F_1$, $F_2$, $F_3$, $F_4$ and $F_5$ thereof have high color shift. The lights observed at the detective point $D_2$ of the large viewing angle are formed from mixing high color shift light $F_3$ and low color shift light $E_4$. Thus, because an overall result of the lights is produced, color shift at the detective point $D_2$ is reduced.

Figure 2C:
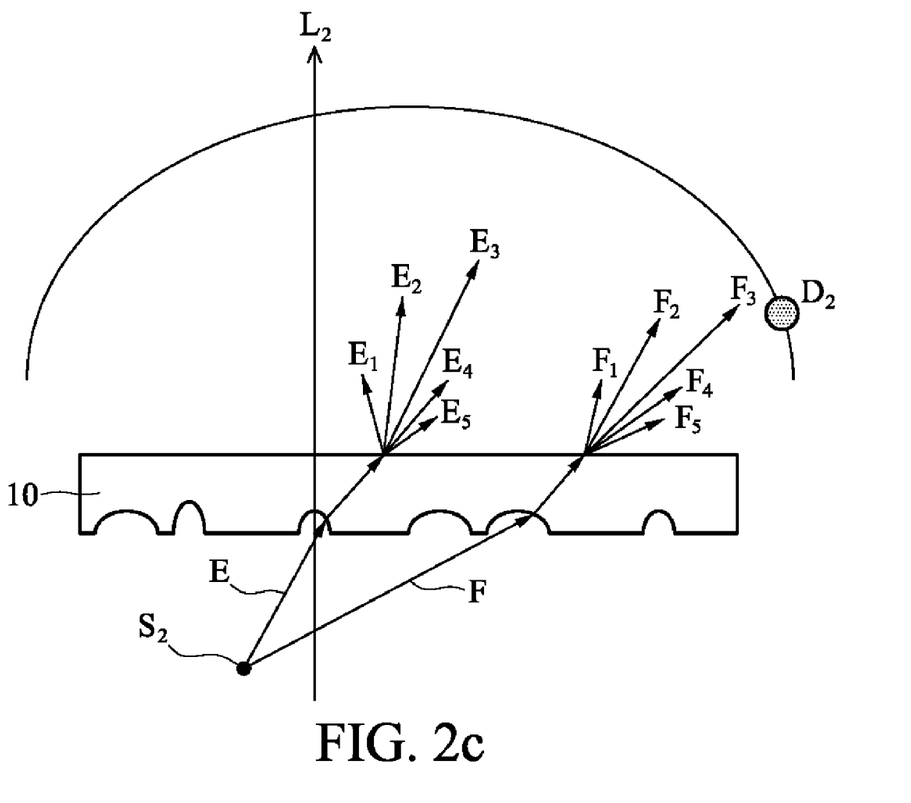
FIG. 2c is a cross section showing light intensity distribution states for light $S_2$ leaving the cholesteric liquid crystal film with a plurality of grooves irregularly dispersed on a surface thereof according to another embodiment of the invention.

Referring to FIG. 2c, a schematic view of the light intensity distribution states for light $S_2$ leaving the cholesteric liquid crystal film 10, having a plurality of grooves irregularly dispersed on a surface thereof, according to another embodiment of the invention is shown. The difference between FIGS. 2b and 2c is that in FIG. 2c, the light $S_2$ enters the surface with the grooves thereon of the cholesteric liquid crystal film 10 and then passes through the cholesteric liquid crystal film 10 to exit from a plane surface of the film 10 and in FIG. 2b, the process is different. An angle between the path E of the light and the normal line $L_2$ is small, such that the exit lights $E_1$, $E_2$, $E_3$, $E_4$ and $E_5$ thereof have low color shift. However, an angle between the path F of the light and the normal line $L_2$ is large, such that the exit lights $F_1$, $F_2$, $F_3$, $F_4$ and $F_5$ thereof have high color shift. The lights observed at the detective point $D_2$ of the large viewing angle are formed from mixing high color shift light $F_3$ and low color shift light $E_4$. Thus, because an overall result of the lights is produced, color shift at the detective point $D_2$ is reduced. From the results of FIGS. 2b and 2c, it is shown that both the surface with the grooves thereon and the other plane surface of the cholesteric liquid crystal film can be used to reduce color shift.

Moreover, the cholesteric liquid crystal films 10 with the plurality of grooves irregularly dispersed on a surface thereof according to the embodiments of the invention not only can improve uniformity of brightness at each viewing angle, but can also improve uniformity of the light color and reduce color shift. In the embodiments of the invention, the density of grooves in the cholesteric liquid crystal films 10 will influence the characters of the cholesteric liquid crystal films. Therefore, proper control of the density of the grooves, for example, may be accomplished by controlling the thickness of the coating and the temperature of the exposure process for the coating to achieve the requirements for high transmission and low color shift.

In the embodiments of the invention, the cholesteric liquid crystal films may be formed by using a crosslinkable liquid crystal such as RMS03-008, RMS03-009 or RMS03-010 produced by Merck. In the process of curing the cholesteric liquid crystal film, a plurality of grooves are formed by self-assembly or self-aggregation and dispersed in the body of the film, or a plurality of grooves are formed by phase separation, together with the curing of the film.

Figure 3:
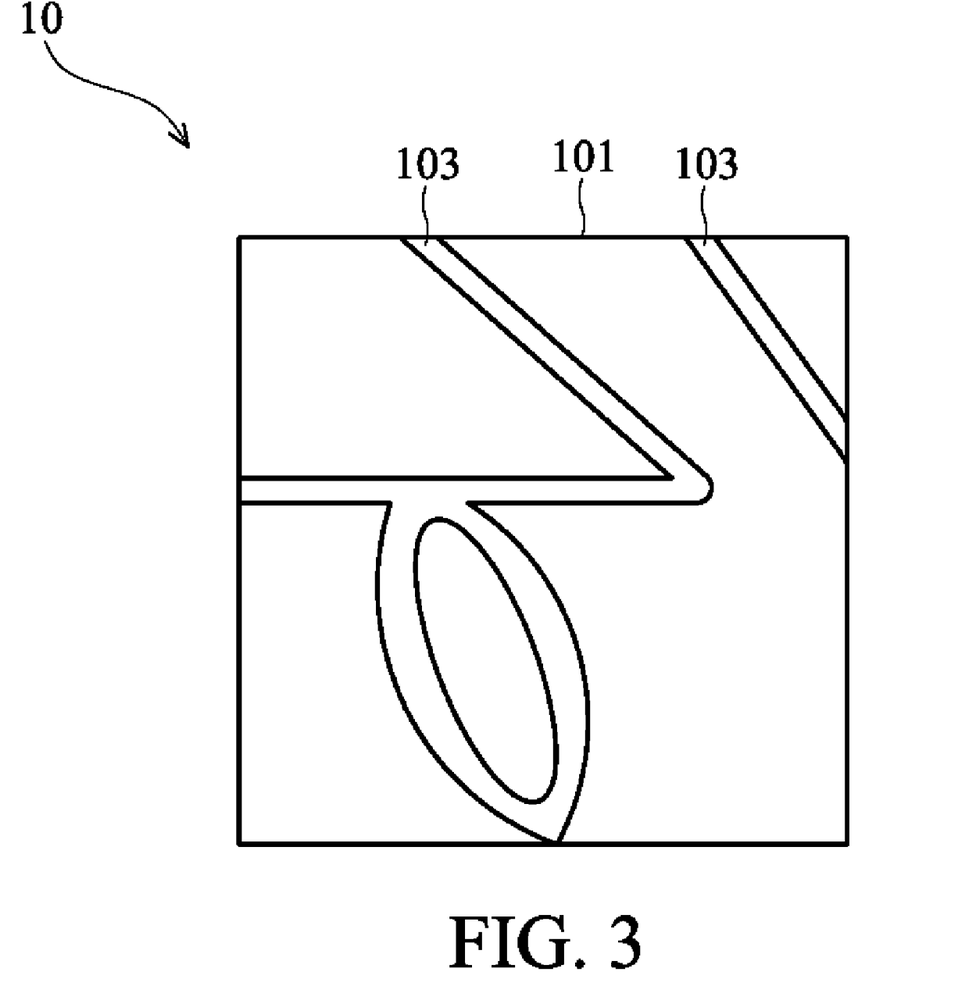
FIG. 3 is a plane view showing a cholesteric liquid crystal film with a plurality of grooves irregularly formed on a surface thereof according to one embodiment of the invention.

Referring to FIG. 3, a plane view of a cholesteric liquid crystal film according to one embodiment of the invention is shown. A plurality of grooves 103 are irregularly formed on a surface of the cholesteric liquid crystal film 10. In the embodiments of the invention, the cholesteric liquid crystal film may have one or more than one layer of the cholesteric liquid crystal film, therefore the surface with the plurality of irregular grooves can be disposed on a surface of any layer of the cholesteric liquid crystal film. The grooves may have a depth of between 0.3 and 3 μm and a width of between 0.3 and 10 μm. The size and the distribution density of the grooves can be controlled by adjusting the process parameters of forming the plurality of grooves in the cholesteric liquid crystal film, for example, the thickness of the coating and the temperature of fabricating the liquid crystal film.

Figure 4:
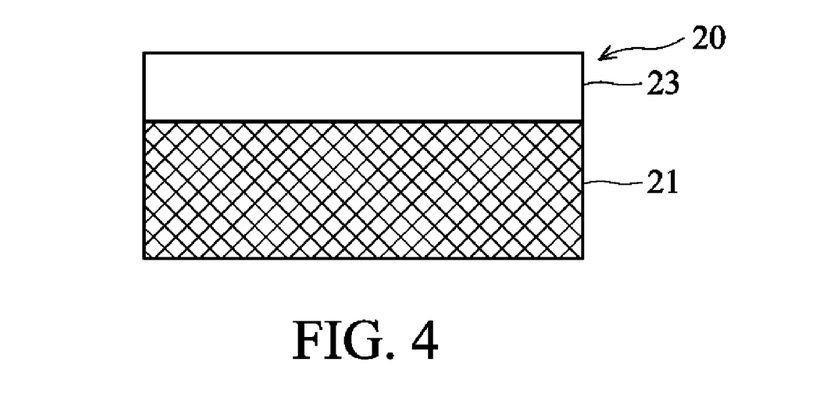
FIG. 4 is a cross section showing a low color shift polarizer assembly according to one embodiment of the invention.

Referring to FIG. 4, a cross section of a low color shift polarizer assembly according to one embodiment of the invention is shown. In one embodiment of the invention, the low color shift polarizer assembly 20 uses a cholesteric liquid crystal film 21 with a plurality of grooves irregularly dispersed on a surface thereof as a polarizing light separation film, which has a selective reflective wavelength range of a long wavelength boundary ≧700 nm and a short wavelength boundary ≦420 nm. The cholesteric liquid crystal film 21 can be used as a circular polarizer. The cholesteric liquid crystal film 21 is combined with a quarter wavelength retardation plate 23 and disposed under the quarter wavelength retardation plate 23 to form a low color shift linear polarizer. The low color shift linear polarizer can transfer a circular polarizing light into a linear polarizing light and can also reduce color shift.

The quarter wavelength retardation plate in the low color shift polarizer assembly of the invention requires proper optical characters. For example, in one embodiment of the invention, the quarter wavelength retardation plate based on a wavelength of 550 nm has an in-plane retardation Ro of 130±30 nm and an absolute value of an out-of-plane retardation Rth between 0.2 times Ro and 2 times Ro. In another embodiment of the invention, the quarter wavelength retardation plate based on a wavelength of 550 nm has an in-plane retardation Ro of 130±10 nm and an out-of-plane retardation Rth between 0.2 times Ro and 2 times Ro. Moreover, the quarter wavelength retardation plate has a ratio of an in-plane retardation Ro based on a wavelength of 450 nm to an in-plane retardation Ro based on a wavelength of 650 nm between about 0.6 and 1.6.

The polarizer assembly formed from combining the above described quarter wavelength retardation plate and the cholesteric liquid crystal film having the plurality of grooves irregularly dispersed on a surface thereof according to the embodiments of the invention can further improve color shift when the polarizer assembly is used as a reflective polarizer or an enhanced brightness film. Therefore, a quarter wavelength retardation plate with a proper value of Rth is selected to combine with the cholesteric liquid crystal film having the plurality of grooves irregularly dispersed on a surface thereof according to the embodiments of the invention to form the polarizer assembly. The polarizer assembly can make the light intensity at various wavelengths more consistent viewing angles are changed and the display of the light color more uniform.

In addition, referring to FIG. 4, although the quarter wavelength retardation plate 23 is shown by using a single plate of retardation film, the quarter wavelength retardation plate in the low color shift polarizer assembly of the invention can also comprise of more than one retardation plate. Moreover, although the cholesteric liquid crystal film 21 in FIG. 4 is shown by using a single layer, the cholesteric liquid crystal film in the low color shift polarizer assembly of the invention can also comprise of more than one layer of the cholesteric liquid crystal film. Therefore, the surface with a plurality of irregular grooves thereon can be disposed on a surface of any layer of the cholesteric liquid crystal film.

Figure 5:
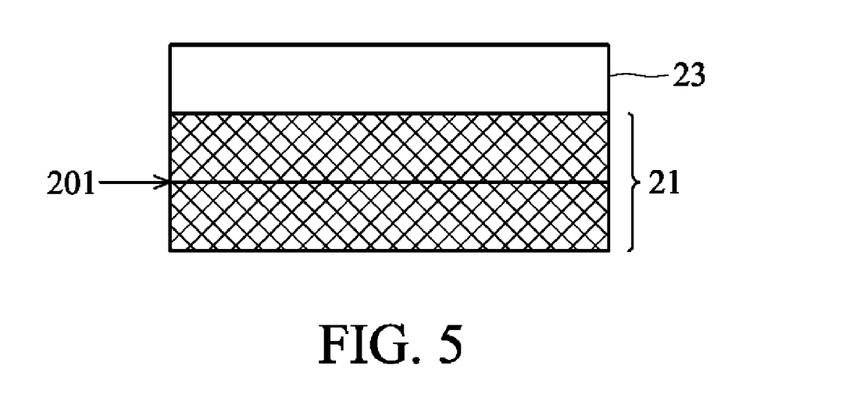
FIG. 5 is a cross section showing a low color shift polarizer assembly according to another embodiment of the invention, which has two layers of the cholesteric liquid crystal films therein.
Figure 6:
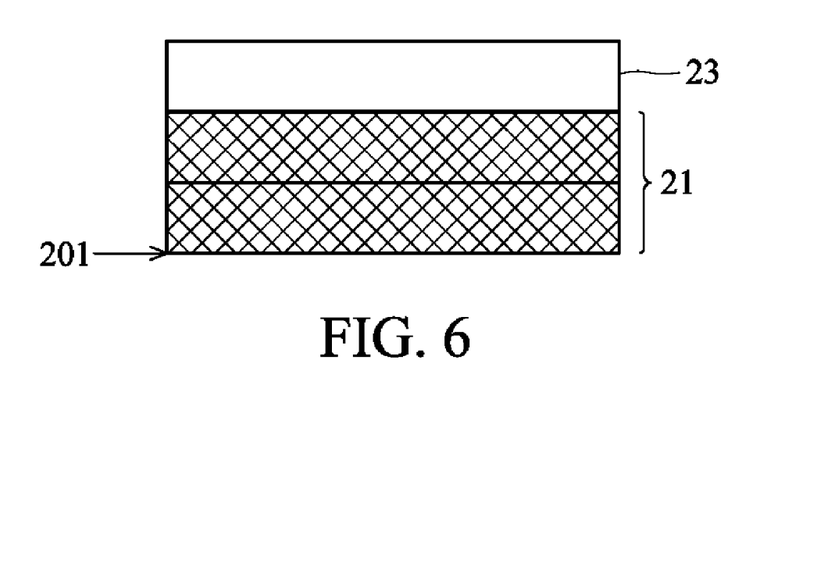
FIG. 6 is a cross section showing a low color shift polarizer assembly according to further another embodiment of the invention, which has two layers of the cholesteric liquid crystal films therein.

Referring to FIG. 5, a cross section of a low color shift polarizer assembly according to another embodiment of the invention is shown, wherein the quarter wavelength retardation plate 23 is disposed over the cholesteric liquid crystal film 21 and the surface 201 of the cholesteric liquid crystal film 21 having the grooves is disposed facing the quarter wavelength retardation plate 23. Moreover, referring to FIG. 6, a cross section of a low color shift polarizer assembly according to another embodiment of the invention is shown, wherein the quarter wavelength retardation plate 23 is disposed over the cholesteric liquid crystal film 21 and the surface 201 of the cholesteric liquid crystal film 21 having the grooves is oppositely disposed to the quarter wavelength retardation plate 23.

According to the theory of chromatology, each color of light can be achieved by adjusting three primary colors of red, green and blue and the light intensity. A specific ratio of the three primary colors of lights and a specific ratio of light intensity can form a white light. Currently, luminescent spectra of the light sources used in displays, for example, luminescent spectra of a cold cathode fluorescent lamps (CCFL) or luminescent spectra of light emitting diodes (LED) are not continuous spectra. The above described light sources have a blue light range of 430 to 480 nm, a green light range of about 520 to 570 nm and a red light range of about 600 to 650 nm or longer wavelengths. The above description of low color shift, i.e. uniform light color displays, especially for white light as the base color, all needs the wavelength ranges of the above description. The plurality of grooves and the interfaces between the grooves in the cholesteric liquid crystal film of the invention can adjust and balance light color, such that the light color at each viewing angle can compensate with each other to display a more uniform color, and the enhanced brightness effects at each viewing angle may be more consistent.

Figure 7:
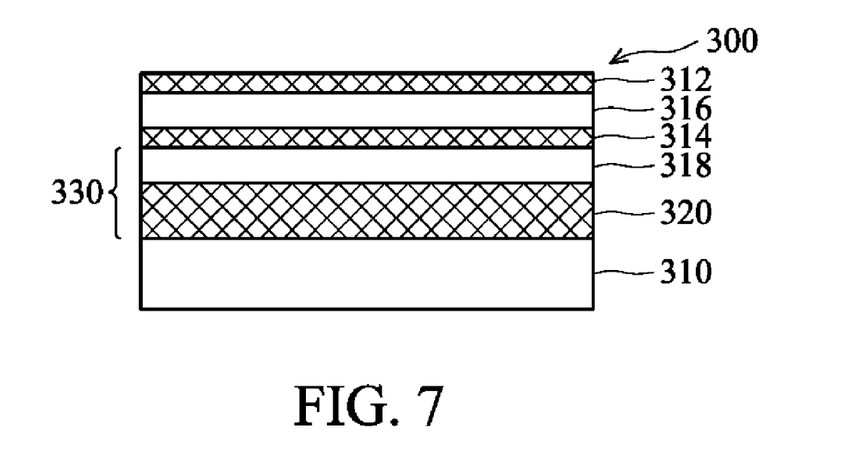
FIG. 7 is a cross section of a liquid crystal display of an embodiment of the invention.

The low color shift polarizer assembly of the invention can be used in a transmissive liquid crystal display. In one embodiment of the invention, a cross section of a liquid crystal display 300 is as shown in FIG. 7, wherein a pair of top and bottom polarizers 312 and 314 is disposed oppositely to sandwich a liquid crystal cell 316. The liquid crystal cell 316 comprises a color filter substrate and an array substrate sandwiching a liquid crystal layer (not shown). The polarizer assembly 330 of the invention is disposed between the bottom polarizer 314 and a backlight source 310. The polarizer assembly 330, comprising a quarter wavelength retardation plate 318 comprising one or more retardation films, is disposed on a cholesteric liquid crystal film 320, having a plurality of grooves. The polarizer assembly 330 consists of one or more layers of the cholesteric liquid crystal films. The combination of the quarter wavelength retardation plate 318, the cholesteric liquid crystal film 320 having a plurality of grooves and the backlight source 310 can provide a low-color-shift polarizing light source. The low color shift polarizer assembly of the invention combined with a backlight module can enhance utilization of light energy of the liquid crystal display, and provide increased brightness and better color accuracy for liquid crystal displays and the backlight modules at large viewing angles.

The cholesteric liquid crystal film of the invention, having a plurality of grooves irregularly dispersed on a surface thereof, may be formed by a cholesteric liquid crystal with acrylate group, or by adding a proper ratio of a chiral dopant in a nematic liquid crystal to form a chiral nematic liquid crystal. The cholesteric liquid crystal with acrylate group is such as RMS03-008, RMS03-009 or RMS03-010 produced by the Merck company, or Heliso10142, Heliso10250 or Heliso10359 produced by the Wacker company. The nematic liquid crystal is such as RMS-82 produced by the Merck company or R1057 produced from the BASF company. The chiral dopant is such as R-1011 or S-811 produced by the Merck company. In addition, a photo initiator such as I-907 produced by the Ciba company can be added in the composition of the cholesteric liquid crystal film and dissolved in a solvent such as toluene to form a polymerizable cholesteric liquid crystal composition. In the polymerizable cholesteric liquid crystal composition, the cholesteric liquid crystal is about 5 to 50 wt %, the photo initiator is about 0.1 to 3 wt %, and the solvent is about 47 to 94.9 wt %.

The cholesteric liquid crystal film of the invention, having a plurality of grooves irregularly dispersed on a surface thereof, can be formed by various coating methods. For example, the cholesteric liquid crystal composition can be formed on a substrate such as poly(ethylene terephthalate) (PET) film by die coating, spin coating or doctor's blade coating. The substrate can be selectively performed by a rubbing process and then the process temperature is controlled within the temperatures of the cholesteric liquid crystal phase. After the annealing process, the film is cured by UV light irradiation to crosslink the cholesteric liquid crystal film with a plurality of grooves irregularly dispersed on a surface thereof.

The examples and the comparative examples of fabricating the cholesteric liquid crystal films and the measurement of color shift for the combinations of the cholesteric liquid crystal films and a quarter wavelength retardation plate are described as below.

EXAMPLE 1

Figure 8:
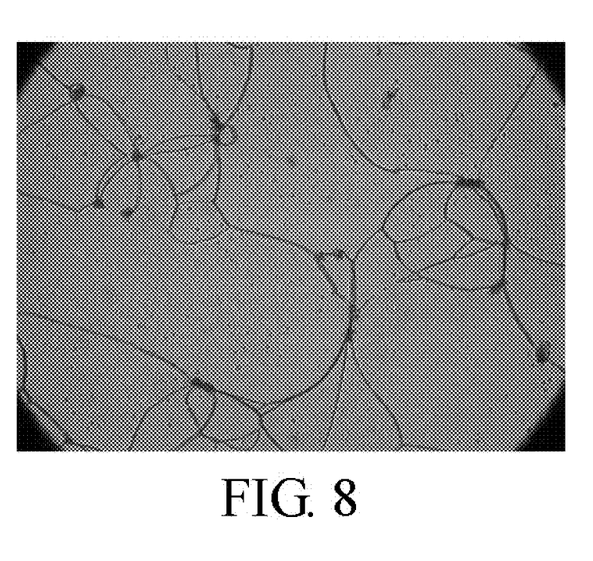
FIG. 8 shows a photograph of the cholesteric liquid crystal film according to the Example 1 of the invention by a reflective polarizing light microscope.
Figure 9:
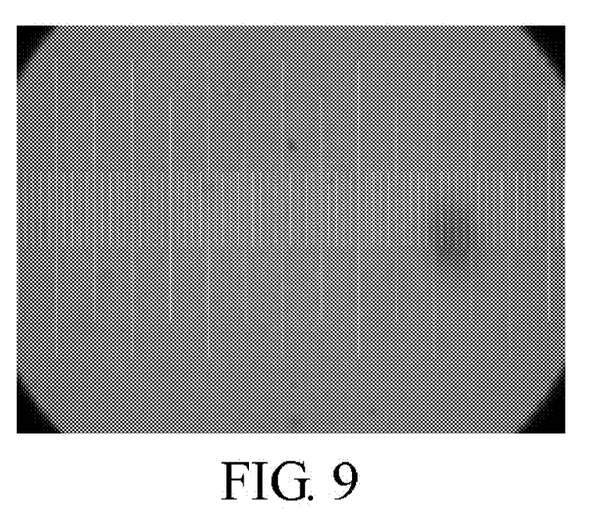
FIG. 9 shows a photograph of a standard scale ruler by a reflective polarizing light microscope, which has the same scale with FIG. 8, wherein the smallest distance of the scale is 10 micrometers.
Figure 10A:
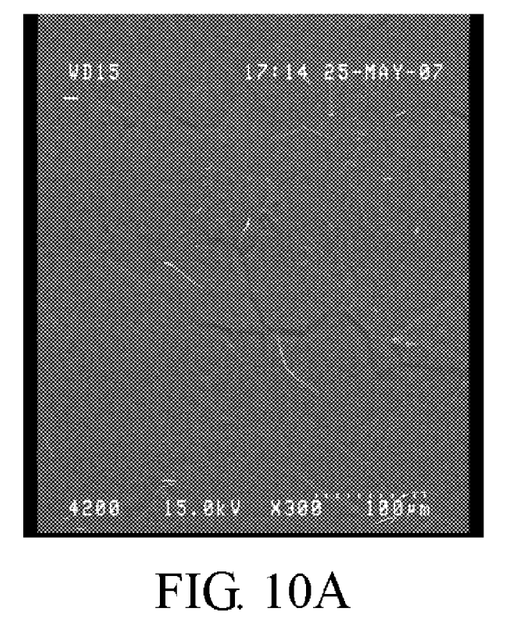
FIG. 10A shows a photograph of a plane view of the cholesteric liquid crystal film according to the Example 1 of the invention by a scanning electron microscope.
Figure 10B:
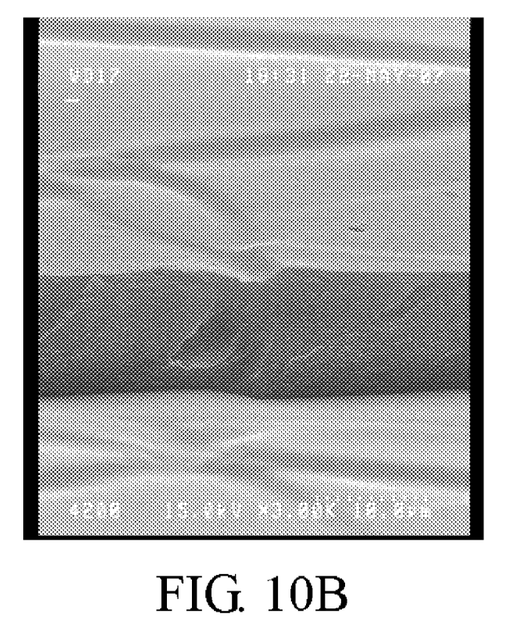
FIG. 10B shows a photograph of a cross section of the cholesteric liquid crystal film according to the Example 1 of the invention by a scanning electron microscope.

The cholesteric liquid crystal compositions Heliso10142, Heliso10250 and Heliso10359 produced by the Wacker company having a solid content of 30 wt % were mixed by a ratio of 1:2:1, and then coated by a doctor-blade coating on a PET film which was pre-treated by rubbing. Then, the coating was heated on a hot plate at 100±5° C. to dry the solvent therein. Under an environment of nitrogen, the coating was annealed on a hot plate at 100±5° C., and then irradiated by UV light for about 30 seconds to perform a crosslinking process. As a result, the coating was cured to form the cholesteric liquid crystal film of Example 1 with a plurality of irregularly dispersed grooves of medium density, which had a thickness of about 6 μm. The surface of the cholesteric liquid crystal film of Example 1 with a plurality of grooves thereon was observed by a reflective polarizing light microscope and the result is shown in FIG. 8. FIG. 9 is a result of a standard scale ruler observed by a reflective polarizing light microscope, which has the same scale with FIG. 8, wherein the smallest distance of the scale is 10 μm. In addition, photographs of a plane view and a cross section of the cholesteric liquid crystal film according to the Example 1 of the invention observed by a scanning electron microscope are shown in FIGS. 10A and 10B, respectively.

EXAMPLE 2

Figure 11:
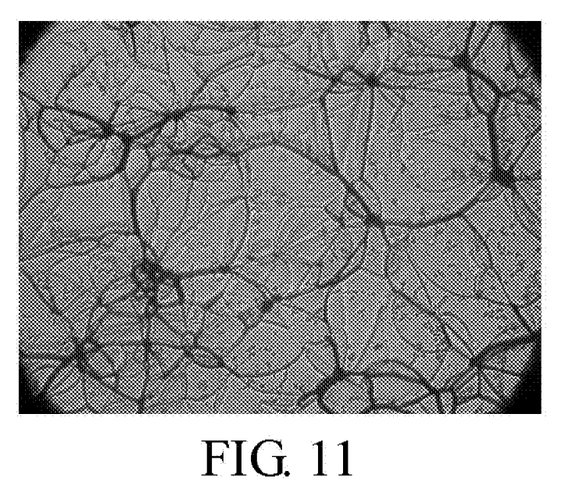
FIG. 11 shows a photograph of the cholesteric liquid crystal film according to the Example 2 of the invention by a reflective polarizing light microscope.
Figure 12:
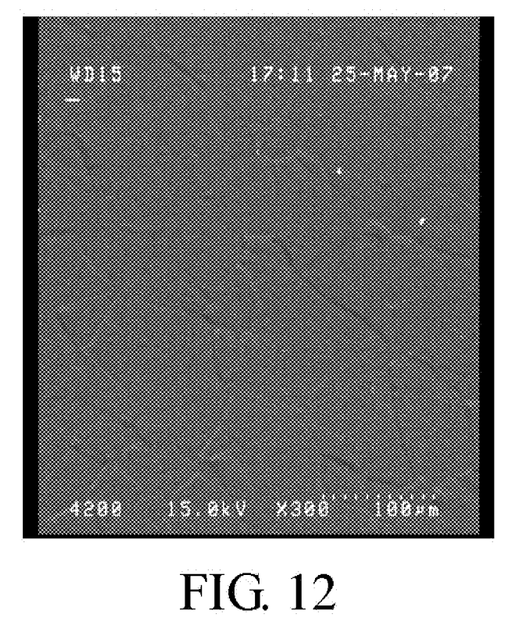
FIG. 12 shows a photograph of a plane view of the cholesteric liquid crystal film according to the Example 2 of the invention by a scanning electron microscope.

The cholesteric liquid crystal compositions Heliso10142, Heliso10250 and Heliso10359 produced by the Wacker company having a solid content of 30 wt % were mixed by a ratio of 1:2:1, and then coated by die coating on a PET film which was pre-treated by rubbing. Then, the coating was heated on a hot plate at 100±5° C. to dry the solvent therein. Under an environment of nitrogen, the coating was annealed on a hot plate at 85±5° C., and then irradiated by UV light for about 40 seconds to perform a crosslinking process. As a result, the coating was cured to form the cholesteric liquid crystal film of Example 2 with a plurality of irregularly dispersed grooves of high density, which had a thickness of about 8 μm. The surface of the cholesteric liquid crystal film of Example 2 with a plurality of grooves thereon was observed by a reflective polarizing light microscope and the result is shown in FIG. 11. In addition, a photograph of a plane view of the cholesteric liquid crystal film according to the Example 2 of the invention observed by a scanning electron microscope is shown in FIG. 12.

EXAMPLE 3

The cholesteric liquid crystal compositions Heliso10142 produced by the Wacker company having a solid content of 30 wt % was coated by spin coating on a PET film which was pre-treated by rubbing. Then, the coating was heated on a hot plate at 100±5° C. to dry the solvent therein. Under an environment of nitrogen, the coating was annealed on a hot plate at 90±5° C., and then irradiated by UV light for about 30 seconds to perform a crosslinking process. Then, the cholesteric liquid crystal compositions Heliso10250 andHeliso10359 produced by the Wacker company were coated in sequence on the cured cholesteric liquid crystal film by the same method as the above. As a result, the cholesteric liquid crystal film of Example 3 with a plurality of irregularly dispersed grooves was formed, which had a thickness of about 8.5 μm.

COMPARATIVE EXAMPLE 1

Figure 13:
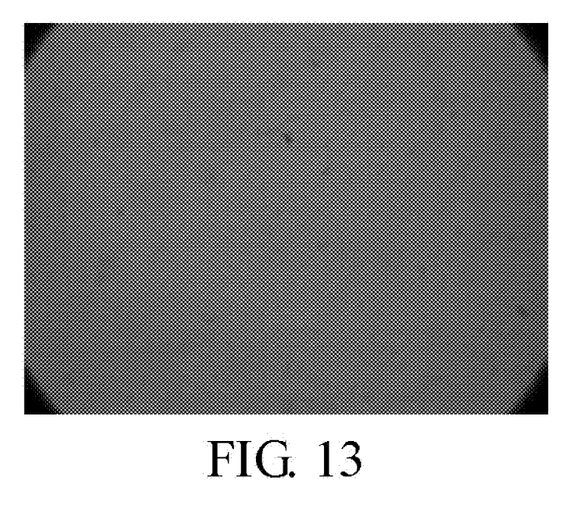
FIG. 13 shows a photograph of the cholesteric liquid crystal film according to the Comparative Example 1 of the invention by a reflective polarizing light microscope.
Figure 14:
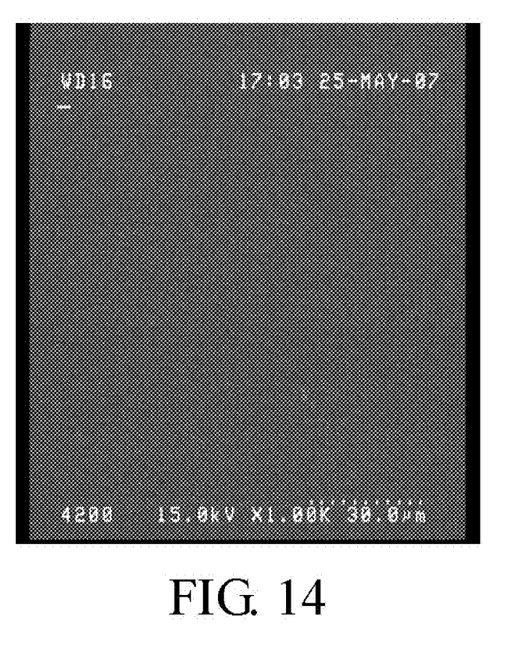
FIG. 14 shows a photograph of a plane view of the cholesteric liquid crystal film according to the Comparative Example 1 of the invention by a scanning electron microscope.

The cholesteric liquid crystal compositions RMS03-008, RMS03-009 and RMS03-010 produced by the Merck company were respectively coated in order by spin coating on three PET films which were pre-treated by rubbing. Under an environment of nitrogen, the coatings were irradiated by UV light at 90±5° C. to perform a crosslinking process. The respective films had a thickness of about 2.5 μm. Then, the three cured cholesteric liquid crystal films were bonded by photo glue to form the cholesteric liquid crystal film of Comparative Example 1, which had a final thickness of about 50 μm. The surface of the cholesteric liquid crystal film of Comparative Example 1 was observed by a reflective polarizing light microscope and the result is shown in FIG. 13. In addition, a photograph of a plane view of the cholesteric liquid crystal film of Comparative Example 1 observed by a scanning electron microscope is shown in FIG. 14.

COMPARATIVE EXAMPLE 2

The cholesteric liquid crystal compositions Heliso10142, Heliso10250 and Heliso10359 produced by the Wacker company were mixed by a ratio of 1:2:1, and then coated by die coating several times on a PET film which was pre-treated by rubbing. The thickness of the coating was about 5 μm. Then, the coating was heated on a hot plate at 100±5° C. to dry the solvent therein. Between the coating processes, a crosslinking process as was performed first and then a subsequent coating process was performed. The crosslinking process was performed under an environment of nitrogen, and irradiated by UV light at 100±5° C. As a result, the cholesteric liquid crystal film of Comparative Example 2 was formed.

COMPARATIVE EXAMPLE 3

The cholesteric liquid crystal compositions RMS03-008, RMS03-009 and RMS03-010 produced by the Merck company having a solid content of 30 wt % were coated in order by spin coating on a PET film which was pre-treated by rubbing. Then, the coating was heated on a hot plate at 100±5° C. to dry the solvent therein. Between the coating processes, a crosslinking process was performed first and then a subsequent coating process was performed. The crosslinking process was performed under an environment of nitrogen, and irradiated by UV light at 90±5° C. As a result, the cholesteric liquid crystal film of Comparative Example 3 was formed, which had a thickness of about 7 μm.

The cholesteric liquid crystal films of Examples 1, 2 and 3 and Comparative Examples 1, 2 and 3 were respectively disposed under a quarter wavelength retardation plate to form polarizer assemblies. The quarter wavelength retardation plates used for each Example and Comparative Example, based on a wavelength of 550 nm, and with an in-plane retardation Ro and an out-of-plane retardation Rth are shown in Table 1. The quarter wavelength retardation plate of each Example and Comparative Example is a product of Japan teijin chemicals, LTD. Moreover, the cholesteric liquid crystal films of Examples 1, 2 and 3 had a density of irregularly dispersed grooves higher than that of Comparative Examples 1, 2 and 3. The comparison of groove density of the cholesteric liquid crystal films between the Examples and Comparative Examples were obtained by observing the density of the grooves on the surface of the cholesteric liquid crystal film through an optical microscope. The selective reflection wavelength ranges of the cholesteric liquid crystal films of the Examples and Comparative Examples are shown in Table 1.

The color shift values (du'v') of each polarizer assembly of Examples and Comparative Examples at several viewing angle ranges were measured by an Ezcontrast-160 produced by the French Eldim company, the measurement results are shown in Table 1.

TABLE 1 du'v' of polarizer film assemblies comprising the cholesteric liquid crystal films of the Examples and Comparative Examples at several viewing angle ranges

| | selective reflection wavelength range (nm) | groove density | quarter wavelength retardation plate Ro | quarter wavelength retardation plate Rth | color shift value (du'v') at each viewing angle range −60°~−80° | −50°~−60° | −50°~+50° | +50°~+60° | +60°~+80° |
|---|---|---|---|---|---|---|---|---|---|
| Comparative Example 1 | 450~660 | low | 147 | 74 | 0.03~0.044 | 0.004~0.03 | <0.004 | 0.004~0.03 | 0.03~0.036 |
| Example 1 | 450~670 | medium | 147 | 74 | 0.012~0.022 | 0.004~0.012 | <0.008 | 0.004~0.008 | 0.008~0.02 |
| Comparative Example 2 | 440~690 | low | 159 | 80 | 0.016~0.036 | 0.004~0.016 | <0.008 | 0.004~0.016 | 0.016~0.036 |
| Example 2 | 440~650 | high | 147 | 74 | 0.01~0.02 | 0.005~0.01 | <0.016 | 0.005~0.01 | 0.01~0.018 |
| Comparative Example 3 | 430~700 | low | 147 | 74 | 0.016~0.04 | 0.004~0.016 | <0.004 | 0.004~0.016 | 0.016~0.026 |
| Example 3 | 440~700 | medium | 147 | −195 | 0.012~0.018 | 0.008~0.012 | <0.008 | 0.08~0.012 | 0.012~0.016 |

As shown in Table 1, the polarizer assemblies of the Comparative Examples comprised the cholesteric liquid crystal film having low density of grooves and a quarter wavelength retardation plate, wherein the grooves were large and few. However, the polarizer assemblies of the Examples comprised the cholesteric liquid crystal film of the invention having a plurality of grooves irregularly dispersed on a surface thereof and a quarter wavelength retardation plate, wherein the grooves were small and dense. Comparing the polarizer assemblies of the Examples to the polarizer assemblies of the Comparative Examples, the polarizer assemblies of the Examples reduced the color shift value (du'v') by about 0.02 and showed decrease in du'v' of about 25~75% at large viewing angles ranges, wherein the large viewing angles ranges were outside the viewing angles of ±50°. The polarizer assembly comprising the cholesteric liquid crystal film of the invention had lower color shift. In the viewing angle range inside of angles of ±50°, the polarizer assembly of the Examples had color shift slightly higher than that of the Comparative Examples. This was due to parts of the original lights from the large viewing angles being received in the range inside of the viewing angles of ±50°, such that the color shift value was slightly increased after light uniformization. However, the percent of lights from the large viewing angles in the viewing angle range inside of angles of ±50° was low, therefore the color shift was increased only slightly and is acceptable for applications in displays.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A low color shift polarizer assembly, comprising:
    a cholesteric liquid crystal film with a plurality of grooves irregularly dispersed on a surface thereof, having a reflective wavelength range of a long wavelength boundary ≧700 nm and a short wavelength boundary ≦420 nm; and
    a quarter wavelength retardation plate disposed on the cholesteric liquid crystal film,
        wherein the quarter wavelength retardation plate has an in-plane retardation Ro and an absolute value of an out-of-plane retardation Rth between 0.2 times Ro and 2 times Ro.

2. The low color shift polarizer assembly as claimed in claim 1, wherein the plurality of irregularly dispersed grooves are formed by self-assembly, self-aggregation or phase-separation, and the plurality of irregularly dispersed grooves are formed together with curing of the cholesteric liquid crystal film.

3. The low color shift polarizer assembly as claimed in claim 1, wherein the cholesteric liquid crystal film comprises more than one layer.

4. The low color shift polarizer assembly as claimed in claim 3, wherein a surface of at least one layer of the cholesteric liquid crystal film has the plurality of irregularly dispersed grooves.

5. The low color shift polarizer assembly as claimed in claim 4, wherein the plurality of irregularly dispersed grooves have a depth of between 0.3 and 3 μm.

6. The low color shift polarizer assembly as claimed in claim 4, wherein the plurality of irregularly dispersed grooves have a width of between 0.3 and 10 μm.

7. The low color shift polarizer assembly as claimed in claim 1, wherein the quarter wavelength retardation plate based on a wavelength of 550 nm has the in-plane retardation Ro of 130±30 nm.

8. The low color shift polarizer assembly as claimed in claim 1, wherein the quarter wavelength retardation plate based on a wavelength of 550 nm has the in-plane retardation Ro of 130±10 nm.

9. The low color shift polarizer assembly as claimed in claim 1, wherein the quarter wavelength retardation plate has a ratio of an in-plane retardation Ro based on a wavelength of 450 nm to an in-plane retardation Ro based on a wavelength of 650 nm between 1 and 1.6.

10. The low color shift polarizer assembly as claimed in claim 1, wherein a ratio of an in-plane retardation Ro of the quarter wavelength retardation plate based on a wavelength of 450 nm to an in-plane retardation Ro of the quarter wavelength retardation plate based on a wavelength of 650 nm is between 0.6 and 1.

11. The low color shift polarizer assembly as claimed in claim 1, wherein the quarter wavelength retardation plate comprises one or more than one retardation film.

12. The low color shift polarizer assembly as claimed in claim 4, wherein the surface of the cholesteric liquid crystal film having the grooves is disposed facing the quarter wavelength retardation plate.

13. The low color shift polarizer assembly as claimed in claim 4, wherein the surface of the cholesteric liquid crystal film having the grooves is oppositely disposed to the quarter wavelength retardation plate.

14. A low color shift polarizing light source, comprising:
    a backlight module; and
    the low color shift polarizer assembly as claimed in claim 1 over the backlight module.

15. A liquid crystal display, comprising:
    a liquid crystal cell;
    a pair of top and bottom polarizers oppositely disposed to sandwich the liquid crystal cell;
    a backlight source under the liquid crystal cell and the bottom polarizer; and
    the low color shift polarizer assembly as claimed in claim 1 between the backlight source and the bottom polarizer, wherein the cholesteric liquid crystal film faces the backlight source.

16. The liquid crystal display as claimed in claim 15, wherein the liquid crystal display is a transmissive liquid crystal display.

* * * * *